Feb. 25, 1958  M. P. LAUGHLIN  2,824,943
BAKERY PRODUCT HEATER
Filed June 28, 1954
FIG. 1
FIG. 2
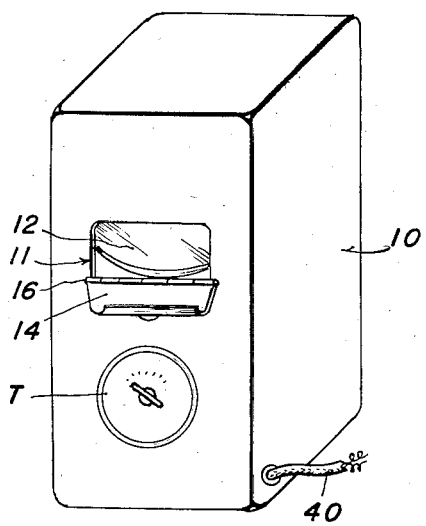
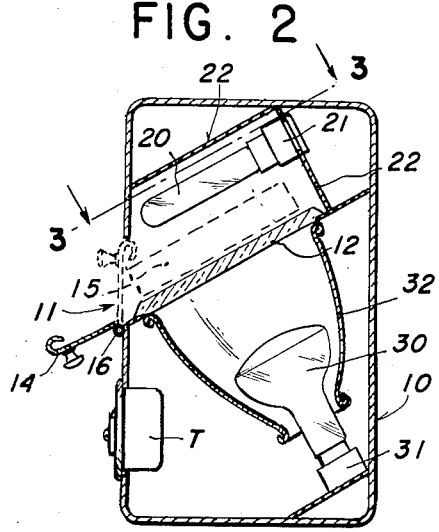
FIG. 3
FIG. 4
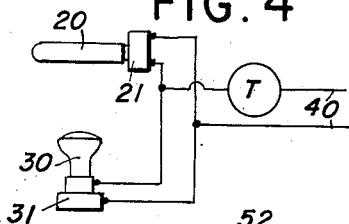
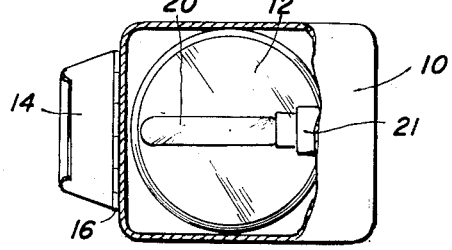
FIG. 5
FIG. 6
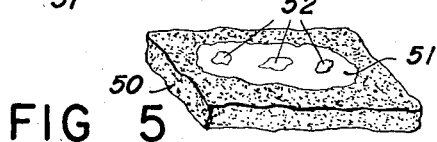
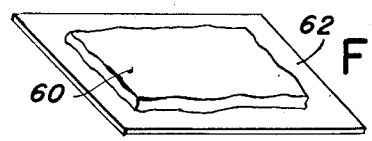
FIG. 8
FIG. 7
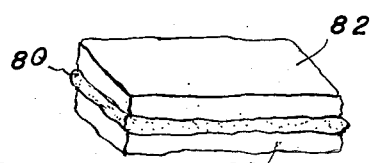
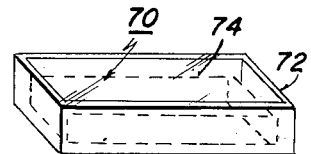
INVENTOR
Myron P. Laughlin United States Patent Office 2,824,943
Patented Feb. 25, 1958

2,824,943

BAKERY PRODUCT HEATER

Myron P. Laughlin, St. Petersburg, Fla.

Application June 28, 1954, Serial No. 439,647

3 Claims. (Cl. 219—35)

This invention relates to food processing and more particularly to heating bakery goods.

It has been the usual practice to serve bakery goods cold when not part of a regular restaurant meal and even when such part, such goods are often placed before the consumer in a cold, clammy condition, far removed from their original freshness. It is the purpose of this invention to provide for the reheating of such products at a very high rate just before they are served, so that their original freshness is regained and in some instances, the taste improved by final toasting.

It is the prime purpose of this invention to provide means which will be instantly available wherever bakery goods are sold to restore the original freshness to such goods and to permit their being served hot and fresh within a few seconds after the customer selects and orders the same.

It is the secondary purpose of this invention to adapt high speed heating elements which have heretofore been known but not fully understood in such fashion that peculiarities of their heating characteristics will be matched with like peculiarities in heating requirements for the various products and for the portions of such products so that satisfactory heating will be accomplished and no part of the bakery product spoiled by overheating and no part left cold.

This invention employs the use of heat rays and particularly those emitted by electrical devices, such as infrared and the like elements in the "near" and "far" infrared wave length category. These rays and their emitters have long been known but have generally been employed individually (as to wave length characteristic) and the matching of such emitters to portions of an entire product, so that each said portion receives the amount and type of ray which is especially adapted to produce maximum results in that particular portion has heretofore not been accomplished. This invention provides such matching and such maximum results through the adaptation and application of old elements in new combination.

A special purpose of this invention will be best understood by examination of a bakery product such as the Italian pizza wherein an undershell of bread dough is coated upon its upper surface with a tomato sauce, white cheese, meat, or fish, olive oil and seasoning. Normal response to infra-red heating by the usual near infra-red rays from lamps would heat the tomato sauce at too high a rate, be likely to burn the dark colored meat and leave the white portions substantially unheated. This invention provides means whereby each of these portions may be heated at the rate and with the type of ray to which it best responds. It will be understood that the above bakery product is but illustrative and that the invention is equally adaptable to other products having variable components.

Reference to the appended drawings and to the attached description will clarify further the purposes of this invention and a preferred method of their accomplishment.

In the drawings—

Fig. 1 is a front perspective of an apparatus embodying my invention.

Fig. 2 is a sectional view substantially on the center line of Fig. 1 in a vertical plane.

Fig. 3 is a plane section of the device shown in Fig. 1 and Fig. 2 taken substantially on line 3—3 of Fig. 2.

Fig. 4 is a diagram of the wiring circuits employed for this particular apparatus.

Fig. 5 is a view taken in perspective of a product treated.

Fig. 6 is a view taken in perspective of a second product.

Fig. 7 serves to show a preferred method of encasing such products for handling.

Fig. 8 shows a composite product to which my invention is advantageously applied.

Referring now in particular to Figs. 1, 2 and 3, casing 10 encloses and supports a ray transparent platten 12 above which is positioned a ray emitter 20 and below which a second ray emitter 30 is positioned. Ray emitter 20 mounts in socket 21 and is provided with a reflector 22 of elongated shape and preferably extending on its sides downward to just above platten 12. Ray emitter 30 is also provided with a reflector 32 which is here of substantially parabolic shape and which extends upward to just below platten 12. Emitter 30 is mounted in a suitable socket 31 and this socket as well as socket 21 are connected through suitable wiring (see Fig. 4) to a timer device T and thence to the electrical supply cord 40. Just in front of platten 12 at the product insertion opening 11 of casing 10, I prefer to provide a small shelf or projection 14 aiding the insertion and removal of the product generally indicated by 15 in Fig. 2.

Examination of the drawings will show that the product 15 is supported by platten 12 between emitter 20 and emitter 30 and their respective reflectors so that it is not only in the path of the direct rays from such emitters, but is also within the continued path of reflection of such rays since those escaping from emitters 20 through the platten 12 are re-reflected by reflector 32 and those escaping upward through platten 12 are redirected by reflector 22 and so on. Thus product 15 is subjected and re-subjected to rays from both emitters upon both of its sides and such rays as are not stopped and used as heat by a given portion of the product, are recirculated to again treat the product. In this fashion each portion of the product receives maximum treatment from the rays from that emitter which best supplies the required wave length.

Ray emitter 20 is preferably of different range to that of emitter 30 and for purposes of illustration, emitter 20 has been shown as of the type emitting the "far" red rays while emitter 30 has been shown as of the type emitting the "near" red rays. It will be understood, of course, that the positions of such emitters is one of convenience and that such positions and the general type of emitter may be varied without departure of the spirit of my invention. It will also be clear that the timing device T (in this instance a clockwork driven switch) provides means for not only accurately determining the time under which product 15 will be treated, but also by controlling the time in which current is applied to the heating elements of the emitters further controls the temperature to which such elements will rise and therethrough the type of ray which they will emit within the characteristics of the given type of emitter.

Referring now to the product of Fig. 5, the pizza base 50 is usually a sheet of bread dough and upon the upper surface of this has been coated white cheese 51, meat or fish pieces 52, seasoning and oil, all on a first coating of tomato sauce. It will at once be evident to those skilled in the use of infra-red ray heating that the tomato sauce is of such color and absorption characteristic that substantially all of the "near" red rays emitted by lamp emitter 30 will be absorbed by this sauce. On the other hand "far" red rays from the coiled type of emitter 20 would affect all of the ingredients while both types of rays will affect the oils and greases. It will be noted that the improved construction provides that the "near" red rays penetrate the base 50 before reaching those portions of the product most affected by them; thus the portions of the product least affected are brought nearer to the ray source most affecting it. The converse will, of course, be true for the emitter here positioned above the product.

As was previously stated the pizza was selected merely for purposes of easy illustration and in the case of certain products, such as that shown in Fig. 6 at 60, I prefer to interpose a screen or partial barrier 62 above or below the product to modify the rays reaching such product from a particular emitter by direct emission.

Fig. 7 shows a preferred form of container for perishable bakery products, such as are indicated by the dotted lines 70 and in this instance substantially rigid sides of paper board or the like are indicated at 72; it being understood that both the top 74 and the bottom 75 of such container may be of transparent or translucent material which may have partial resistance to passage of certain types of ray as has been indicated in Fig. 6.

In Fig. 8, I have shown a bakery product of the sandwich type wherein a filling 80 is encased between bread slices 82. It will be understood that here the filling may be of a type particularly susceptible to heat rays of a given length, as for instance—yellow cheese or dark meat products. On the other hand, the bread slices 82 may be of white bread and little affected by the same rays. In this instance, it will be understood that the shorter rays will immediately heat the filler 80 while the "far" rays will toast the white bread; all within substantially the same time and with the same application of emissions. I have also found it desirable to utilize heating elements of the enclosed emitter type and of the non-enclosed type so that the degree of oxidation effected thereby may be controlled.

It will be obvious that my improved construction permits a design of a product and of a product treating apparatus which will rapidly heat and melt and toast the product parts simultaneously in a minimum of time and with a standardized output.

Since such products have such individual characteristics depending in large part upon the individual characteristics of their component portions, it will be understood that each such product requires its special application of heat rays and its special application of time of heating. Thus the secondary purpose of the constricted opening 11 in casing 10 is to prevent the insertion of out of standard products to the machine and I prefer to shape the products to the elongated forms shown in Figs. 5, 6, 7 and 8 so that they will indicate by their form that they are especially suited for best treatment by a given unit. It will be manifest that the shape of opening 11 and of the product may be varied where several such products are to be treated each by different units.

The various parts described including platten 12 have been shown herein as mounted at an angle and shelf 14 as provided with spring hinges 16 to provide means for easy gravity removal of the heated product while the closed shelf door serves the dual purpose of holding the product in correct position and completing the reflector enclosed. This, however, is but one embodiment of a part of the positioning and treating means contemplated.

Manifestly many other such changes and modifications may be made well within the scope of my invention and the spirit of the appended claims.

What I claim is:

1. In a food product-fast heater, a walled housing, an infra-red heat source within said housing and mounted opposite a transparent and substantially non-responsive product support, said support having its upper face inclined to the housing and one of its ends registering with an opening in a wall of said housing, a movable closure for said opening in the housing, said closure operating to control the position of the product on said support, reflecting surfaces also mounted within said housing and cooperating with said support to pass the infra-red rays therethrough and thereover, said reflector surfaces arranged about said support, and a timing device also within said housing and controlling the exposure of said product to the rays from said source.

2. In hot food dispenser means, an aluminum foil container having side walls, a bottom wall and a top wall having a sealed window opening pervious to infra-red heat rays and substantially enclosing the food to be dispensed and ray emitter means capable of quick registry with said opening to discharge rays therethrough to permeate the food in said container and to be reflected within said container by said side walls and bottom wall and be substantially contained therein for maximum effect on the contained food.

3. In food package contents heating means, the combination of an infra-red ray emitting heater with a package constructed of heat reflective material adapted to contain a food unit therein and to encase the same, said package provided with side walls, a bottom wall and a top wall having a heat ray window therein pervious to rays from said heater and capable of registry with said heat ray emitter to admit rays to the package and to the interior of the heat reflective enclosure formed by the side walls, bottom wall and top wall aforesaid, such rays being thus partially immediately absorbed by the enclosed food and then re-reflected by the interior walls of said package enclosure against said food unit until substantially all of the rays are absorbed by the food and rapid and efficient heating of the food unit accomplished without exposing the food unit to contamination.

References Cited in the file of this patent

UNITED STATES PATENTS

| | | |
|---|---|---|
| 1,579,513 | Cameron | Apr. 6, 1926 |
| 2,057,421 | Dickson | Oct. 13, 1936 |
| 2,134,474 | Gillespie | Oct. 25, 1938 |
| 2,236,992 | Broadley | Apr. 1, 1941 |
| 2,340,354 | Wells | Feb. 1, 1944 |
| 2,454,370 | Beaubien | Nov. 23, 1948 |
| 2,495,435 | Welch | Jan. 24, 1950 |
| 2,504,110 | Davis | Apr. 18, 1950 |
| 2,549,619 | Miskella | Apr. 17, 1951 |
| 2,557,832 | McCormick | June 19, 1951 |
| 2,646,495 | Dornbush | July 21, 1953 |
| 2,785,623 | Graham | Mar. 19, 1957 |

OTHER REFERENCES

Infrared, by L. R. Kaller in General Electric Review, March 1941, pp. 167–173.